INVENTOR.
WILLIAM L. KUECHLER
BY
Nelson E. Kimmelman
ATTORNEY

INVENTOR.
WILLIAM L. KUECHLER
BY
Nelson E. Kimmelman
ATTORNEY

INVENTOR.
WILLIAM L. KUECHLER
BY
Nelson E. Kimmelman
ATTORNEY

INVENTOR
WILLIAM L. KUECHLER
BY
Nelson E. Kimmelman
ATTORNEY

United States Patent Office 3,430,932
Patented Mar. 4, 1969

3,430,932
METHOD AND APPARATUS FOR CONTACTING CONTINUOUS AND DISPERSE PHASE SUBSTANCES
William L. Kuechler, Jenkintown, Pa., assignor to Entoleter, Inc., Hamden, Conn., a corporation of Delaware
Continuation-in-part of application Ser. No. 301,480, Aug. 12, 1963. This application Sept. 18, 1967, Ser. No. 671,920
U.S. Cl. 261—28    24 Claims
Int. Cl. B01d 19/00, 15/00

ABSTRACT OF THE DISCLOSURE

A contacting method and apparatus in which a greater density substance (e.g., a liquid) is dispersed in a high velocity, inwardly spiralling flow of a lesser density substance (e.g., a gas) within a contacting zone. A circulating suspension of innumerable small particles of the liquid in the gas, confined within the zone, is formed by the balancing of the centrifugal and centripetal forces exerted on the liquid particles.

---

This is a continuation-in-part of my application Ser. No. 301,480, filed Aug. 12, 1963, now abandoned.

BACKGROUND OF THE INVENTION

Field of the invention

This invention pertains to the general field of contacting of a rotating gas with a liquid or other denser substance.

Description of the prior art

Gas-liquid contacting apparatus (and corresponding methods) include so-called "bubble plate" towers or columns which are quite voluminous, expensive to install and maintain, and limited in their throughput. The conventional bubble plate columns have a maximum vapor velocity in the neighborhood of about 2–3 feet per second. This maximum velocity is given by the so-called "F Number," i.e., the product of the vapor velocity times the square root of the vapor density. It is an arbitrary parameter which indicates at what point an excessive vapor pressure will blow the liquid head off the plates of the column. Even in bubble plate columns in which the maximum vapor velocity is not exceeded, the maximum theoretical liquid-vapor contact is not always attained becasue the normal pressure of the vapor will force a certain amount of the liquid off of the plate and therefore it will not be exposed to the bubbles of gas. This phenomenon of "entrainment" is one of the chief factors in determining the vertical separation between adjacent horizontal plates. The space between adjacent plates is made high enough so that any entrained liquid cannot get carried up into the liquid on the level just above but rather drops down again into the liquid head from which it was separated. This minimal vertical separation tends to increase the volume requirement of conventional towers.

In certain types of contacting apparatus used for processing products such as natural oils, for example, a vacuum is drawn to assist in keeping the processing temperatures lower for prevention of undesired temperature-induced effects in the mixture. This vacuum is usually drawn at the top of the tower but there is usually a significant pressure gain and hence a temperature gain in the stages below so that the mixture is subject to deterioration in these lower stages. In other words, the vacuum possible at the bottom of the tower and in the reboiler in which the process fluids are heated is limited by the necessary pressure differential through the tower. As a result, the pressure and temperature are higher, and the temperature-induced product deterioration is greater than if a lower pressure drop were possible.

Another known approach uses centrifugal force to separate the phases but operate on a co-current basis— i.e., the flow of the disperse (liquid) phase and of the continuous (gas) phase is outward, separation of the phases being achieved by subjecting both phases to a turn in their path. The lighter phase successfully negotiates the turn, the heavier one's momentum prevents it from doing likewise. The result is a higher permissible superficial velocity of the lighter phase, but no improvement in the density of the droplet population or in relative interfacial velocity.

Other known methods also employ centrifugal force as the phase separation agent with counter-current net radial flow of the continuous phase. In these methods, however, the disperse phase moves quickly through the zone and there is no balancing of forces on the disperse and continuous phases which would be conducive to establishment of a dense particle population.

It has been shown above that the chief limiting factor in conventional bubble plate columns are the gas bubbles themselves. That is to say, these bubbles, which may have a practical minimum size of about two tenths of a centimeter in diameter will, as the vapor pressure is increased, tend more and more to coalesce and thereby reduce the contact surface. Eventually, at a certain pressure the gas will blow a hole through the liquid through which is is supposed to bubble. In a given volume of liquid (other than foam), if there were inserted therein as many bubbles as could be fitted next to one another without coalescing, it would turn out that approximately fifty percent of the volume as a maximum is comprised of gas.

In order to achieve the objectives of my invention, I create an effective contact surface per unit of volume which is equal to or considerably greater than is possible with existing methods by creating a large number of liquid dispersed particles and subjecting them to a balance of forces which tends to retain them in the contact zone. Since I desire to effect the contacting operation in a much smaller volume, for example in one-twentieth of the volume of a conventional bubble plate column, I must create an aggregate contact surface which has to be commensurately twenty times as large as the surface generated in the conventional column. By calculations, it can be demonstrated that instead of 2 millimeter diameter *gas* bubbles, it will be necessary to produce liquid particles or droplets in the size range of about 50–100 microns. I also create equivalent or greater contact surfaces by designing my novel system so as preferably to produce turbulent flows of (1) gas, (2) liquid, (3) liquid particles. It is well known that increased relative interphase velocity results in increased contact efficiency. This contact surface per unit volume of contact zone depends directly upon the particle size and the particle spacing. In an idealized case where the particles are spheres of constant diameter ($d$) with uniform spacing (S) between centers, the contact surface per unit volume ($a$) can be calculated by the equation:

$$a = 0.958 \times 10^6 (S/d)^{-3} (1/d)$$

Figure 12:
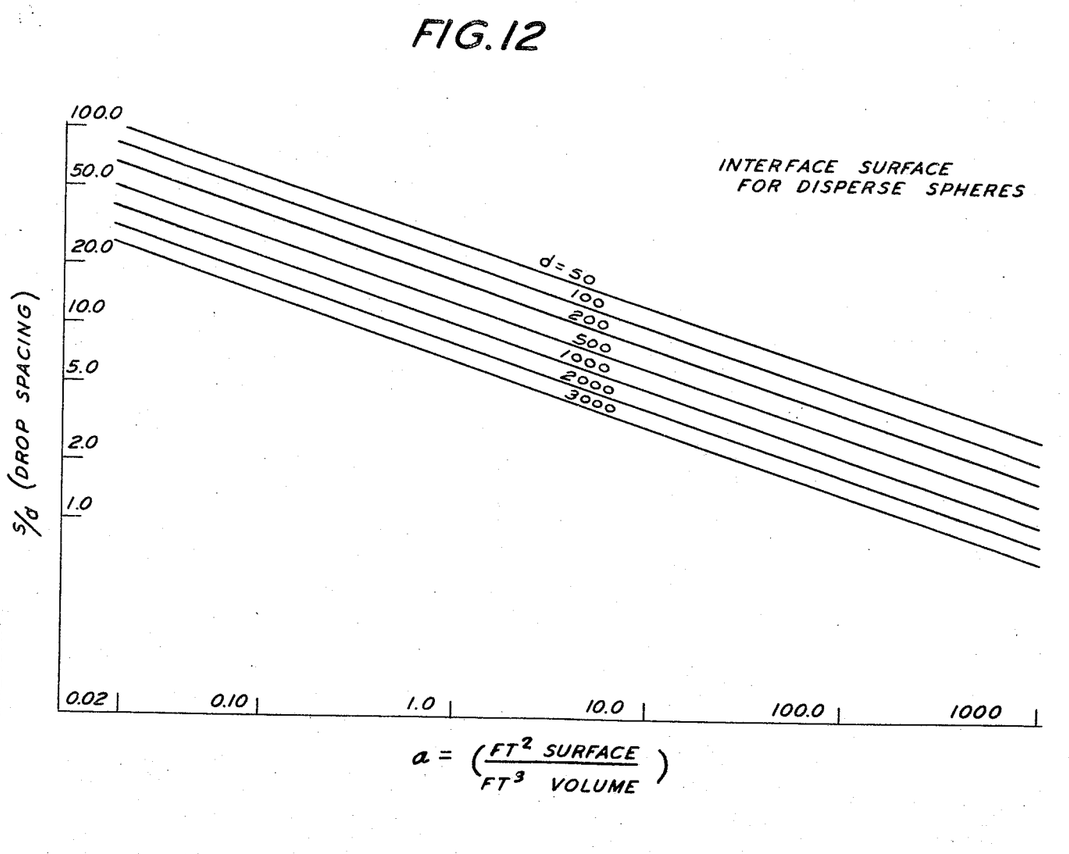

This function is shown graphically in FIGURE 12. My method and apparatus also prevent substantially all of these liquid particles from going out of the apparatus, as particles, with the gas. In diffusion embodiments of my invention the gas becomes progressively enriched by diffusion of low boiler components of the liquid into it as it proceeds upwards through the apparatus and out. Since successful functioning of my method and apparatus *depends* on the production of suspended liquid particles, the vapor pressure used can be much higher than in conventional bubble plate columns, for example, without affecting the overall contacting efficiency of my apparatus.

The efficiency of inter-phase contacting methods is limited by the interfacial surface presented for contact and by the relative velocity at the surface. In the general discussion of contact phenomena presented above, I have stated the reasons why a high population of small particles is desirable in a contact zone and why a high relative velocity is also desirable. Any contacting method must also provide for separation of the phases after the purpose of contact is achieved, and the dispersed phase must be prevented from being entrained in the continuous phase.

My method comprises establishing a contact zone in which the flow velocities and vectors are so controlled as to establish a substantial force balance on the dispersed particles and thereby to establish the high droplet population desirable for efficient contact. In a majority of cases, the disperse phase will be heavier than the continuous phase; for simplicity of exposition, therefore, I shall describe the method as it applies to this circumstance.

The contact zone contains a suspension of particles in a continuous phase of lighter density. The suspension is rotating in the zone and is, therefore, subject to centrifugal force. Because the particles are heavier than the continuous fluid, they tend to "sink" in a radial direction toward the periphery of the zone. The continuous fluid is removed at a controlled rate at the center of the zone and added at the same rate at the periphery and, thus, has an inward radial velocity. The velocity of the continuous phase fluid relative to the dispersed particles imposes a drag force on them which is in a direction opposite to the centrifugal force. If the drag force is less than the centrifugal force, the particles will move out; if it is greater, the particles will move in; and if these forces are equal, the particles will remain at a stable radius.

In one mode of operation, if the disperse phase is a liquid it can be added near the center of the zone. The relative velocity can be so chosen that the liquid will be broken into small drops; large drops will continue to form by agglomeration and be again broken throughout the zone. The disperse phase can be withdrawn as large drops which eventually reach the periphery of the zone.

The method is thus the practice, in a rotary zone whose contents are subject to centrifugal force, of the principle of countercurrent contacting wherein centrifugal force is the separating and flow-inducing mechanism. This centrifugal force can be much greater than force of gravity utilized in many conventional contacting apparatuses with the result that:

(1) The velocity of the continuous phase can be high without danger of entrainment of the small dispersed particles.

(2) The relative velocity can be high enough to disperse the heavy fluid as small drops and to break up large drops which may form by agglomeration.

(3) By proper choice of relative velocity, a high population of small drops may be retained in the contact zone.

(4) Wall effects can be minimized because of the high velocity of the continuous phase.

As stated above, the velocity of the continuous phase can be so chosen that the drag force is equal to the centrifugal force, and the particle will remain at a stable radius.

One skilled in the art will recognize that there are other forces which act on this system but have been treated as negligible in the discussion presented above. Among these forces are the earth's gravity and the non-radial component of the drag force. These and other forces are important and are allowed for in the practice of my invention. In all illustrated embodiments the effect of gravity is offset by a slight upward movement of the incoming gas so that the disperse phase is force-balanced in a direction perpendicular to the vectors of the centrifugal field. Thus the suspension is confined to whirling in the contact zone. I also recognize that the centrifugal force effective on the disperse phase particles is diminished by the centrifugal force acting on the continuous phase. In most cases where the continuous phase is a gas, this effect is minor. But, as for light particles dispersed in a heavy liquid, the *net* force on the particles due to rotation might even be inward and require an outward radial flow of the continuous phase to establish the required drag-centrifugal force balance. These additional factors and variations do not alter the substantive idea of my invention.

In one form of my invention, I provide an apparatus with a selected number of vertically aligned horizontal contacting "levels" or "stages" interspersed alternately with a number of vapor-pressurizing or "compressor" sections which communicate with the next higher and the next lower processing stages. The liquid phase input material which is to be contacted by the gas or vapor phase material is fed into at least one of the contacting levels while the vapor phase material is applied from below. The vapor phase material is forced by the action of the compressor sections, up through slanted apertures at the periphery of a stator plate on which the liquid mixture is collected in each stage. Upon passing through the slanted apertures the vapor is caused to swirl around in an inwardly decreasing spiral.

The liquid in each stage is divided into an outer annular region and an inner annular region by two concentric annular dam members. The inwardly spiralling liquid in the outer region is separated from the gas in the inner region by a depending annular wall member in each stage. The gas pressure in the outer region is greater than the pressure in the inner region and so it bubbles under the depending wall and through the liquid in the inner annular region. In both annular regions, the velocity of the gas is sufficient to produce a very large number of very small liquid particles which become suspended and entrained in the rotating gas currents in each region.

A high speed rotor passes through the center of the apparatus, rotating in the same general direction as the spiralling gas-particle currents. In each of the compressor sections there are a number of compressor blades and in each of the processing stages there are a number of fan blades. These fan blades help to maintain an average number and produce a spatial gradient of sizes of liquid particles in suspension in the inner region. They also serve to cause particles of certain size ranges to agglomerate so that they become part of the liquid mass on the bottom plate of each stage thereby keeping the liquid supply constantly replenished. By their centrifugal action, these blades effectively prevent the very great majority of the very fine liquid phase particles from escaping upward and eventually out of the mass transfer apparatus while simultaneously permitting the much lighter vapor phase material to do so to provide an output. These fan blades, to a limited extent, also assist in producing fine liquid particles from whatever liquid spills over the inner annular dam into the region where they rotate.

By helping to keep the vapor flow counter to the movement of liquid, by helping in the production of small liquid particles, agglomerating others, and by operating to maintain an equilibrium gradient of droplets in suspension in the inner annular region, my novel apparatus can produce a very large amount of self-replenishing constant surface within a very small volume.

Some of the objects of the present invention are to provide:

(1) A novel contacting method in which the purpose of contact can be accomplished in a significantly smaller contact zone than is possible by conventional methods.

(2) A novel contacting method in which significantly higher velocities of the contacting substances can be employed than is possible in methods currently practiced.

(3) A novel contacting method in which the interphase contact surface per unit volume of contact zone is significantly higher than in methods in current use.

(4) A novel contacting method in which the pressure drop through the system can be held to a low value.

(5) A novel contacting method as described above in which the purpose of contact is to achieve mass transfer, heat transfer, chemical reaction, or some combination of these phenomena.

(6) A novel contacting method in which the continuous phase may be a mixture of two or more gases or liquids or may be a single gas or liquid, and the dispersed material may be one or more phases, and they may be liquid or solid.

(7) A novel apparatus for practice of this method which is significantly less expensive to build and operate than is conventional contact apparatus.

DESCRIPTION OF THE FIGURES

FIGURE 1 is partly schematic elevation view of the invention as used in a typical processing environment.

FIGURE 2 is a sectional view taken on a vertical plane passing through the middle of part of the contacting apparatus shown in FIGURE 1.

FIGURE 3 is a sectional view of the apparatus taken along the section line 3—3 in the direction indicated in FIGURE 2.

FIGURE 4 is an enlarged fragment of part of the apparatus shown in FIGURE 2.

FIGURE 5 is an enlargement of part of the apparatus pictured in FIGURE 3 in the broken-line sector 5.

FIGURE 6 is a partly sectional view of the apparatus shown in FIGURE 5 taken along the section line 6—6 therein in the direction indicated.

FIGURE 7 is an enlargement of part of the apparatus shown in FIGURE 3 within the broken-line sector 7.

FIGURE 8 is a sectional view of the part of the apparatus shown in FIGURE 7 taken along the section line 8—8 in the direction indicated.

FIGURE 9 is a sectional view of another form of my invention taken on a vertical plane through its center.

FIGURE 10 is a sectional view of the apparatus shown in FIGURE 9 taken along the section line 10—10.

FIGURE 11 is a perspective view of part of the apparatus illustrated in FIGURES 9 and 10.

FIGURE 12 is a graph showing how the contact surface provided by the present invention can be determined.

FIGURE 13 is a schematic illustration of another embodiment of the present invention.

FIGURE 14 is a schematic illustration of still another form that the invention may take.

OVERALL SYSTEM

Referring to FIGURE 1, the form of my invention first to be considered will initially be explained as part of an overall system for separating a high boiling point liquid from a low boiling point liquid, i.e., water from isopropyl alcohol, to take an illustrative example. A mixture of these liquids is fed through the input pipe 12 to a feed sump 15. A centrifugal pump 16 pumps it via input pipe 14 to my novel "mass transfer" apparatus indicated generally at the numeral 20. The apparatus 20 can be used to take the place of, for example, a so-called "bubble plate" column, or tower, or variations thereof which are conventionally used in distilling or fractionating processes. Within the apparatus 20 the mixture of liquids is applied to a number of vertically aligned horizontal processing "stages" or levels A, B, etc. (FIG. 2).

Generally speaking, the apparatus 20 shown in FIGURE 2 is used to produce a large number of suspended liquid particles of a size which is considerably smaller than the bubbles of gas produced in conventional bubble plate columns. The apparatus 20 has a rotor 30 affixed to a spindle 25 connected to bearing assembly 13, for example. To drive the rotor a pulley is fixed to the top of the spindle 25 as shown and a belt links that pulley to another pulley mounted on the shaft of a motor 23. The rotor 30 pumps the vapor upward through the liquid applied to apparatus 20 and also classifies the liquid particles produced in the respective contacting stages therein. In so doing the apparatus 20 produces highly turbulent rotary flows of the liquid in each stage, in the movement of the vapor (i.e., gas) and in the movement of the liquid droplets in suspension in the vapor (gas) phase material. This produces a large amount of continuously replenishing effective contact surface within a comparatively small volume of a relatively inexpensive machine.

The liquid mixture applied to the apparatus 20 by the input pipe 14 will tend to move generally downward through the apparatus counter to the direction of the rising heated vapor which is predominantly composed of water vapor mixed with a small amount of alcohol vapor. These vapors are produced in a reboiler 45. The descending liquid, from which the low boiler alcohol has been largely extracted by diffusion into the gas, leaves the apparatus through the outlet pipe 43 whence it is applied to the input of the reboiler where it is converted to high pressure heated vapor. The vapor is passed back into the apparatus 20 and bubbles upward under substantially constant pressure through the mixture of liquids present in each stage.

As a result of the transfer by diffusion of low boilers into the ascending vapor in apparatus 20 there will be an enrichment of the alcoholic content of the vapor in each successively higher contacting stage and the enriched vapor will eventually pass out of the apparatus 20 by way of vapor tube 37 to condenser 38.

Condenser 38 has a coolant passed through it as shown. The condensed, predominantly alcoholic liquid passes out through the pipe 39; part of this stream is collected as product in the receiver 41, and part is returned to the apparatus 20 via pipe 40 to serve as the reflux necessary for fractionation.

As stated previously, the down-coming mixture of liquids in the apparatus 20 which has progressively decreasing amounts of alcohol content therein in the lower stages will eventually pass out through a central aperture in the bottom plate of the apparatus 20 into the tube 43. Most of it will be fed into the bottom of the reboiler 45 but a small amount of it will be fed via a narrow pipe 47 to a "bottoms" receiver 48. The receiver 48 will therefore hold a mixture of liquids consisting primarily of water and only minimally of alcohol.

DETAILED STRUCTURE OF APPARATUS 20

Referring now to FIGURES 2-8, more of the structural details and operation of the novel mass transfer apparatus 20 will now be explained.

The apparatus 20 consists of a selected number of vertically arranged processing "stages" ranging from the topmost stage A to the bottommost stage $n$. Each of the stages consists of an annular bottom plate such as the plates 28a, 28b, . . . 28n, which have respectively outer scalloped edges 29a, 29b, . . . 29n. These edges 29 are shown in magnified view in FIGURES 7 and 8 wherein it is seen that they are slanted so that vapor or gas passing upwards through this region will tend to move in a counter-clockwise and inwardly spirally path. Each of the bottom plates 28a, etc. also has formed therein three upwardly tapering apertures 31a, 31b, . . . 31n disposed at 120° apart through which gas or vapor can also pass. The plates 28a, etc., are supported on annular spacers 17 interposed between their lower surfaces and the top surfaces of the generally annular stator members 26a, 26b, etc., whose outer edges are fixedly disposed within segments of the outer wall 21 of the apparatus 20. These stator members 26a, etc., are the top boundaries of the respective stages. They have fixed to their respective inner edges generally annular rings 27a, 27b, etc., having an L-shaped cross section.

Figure 3:
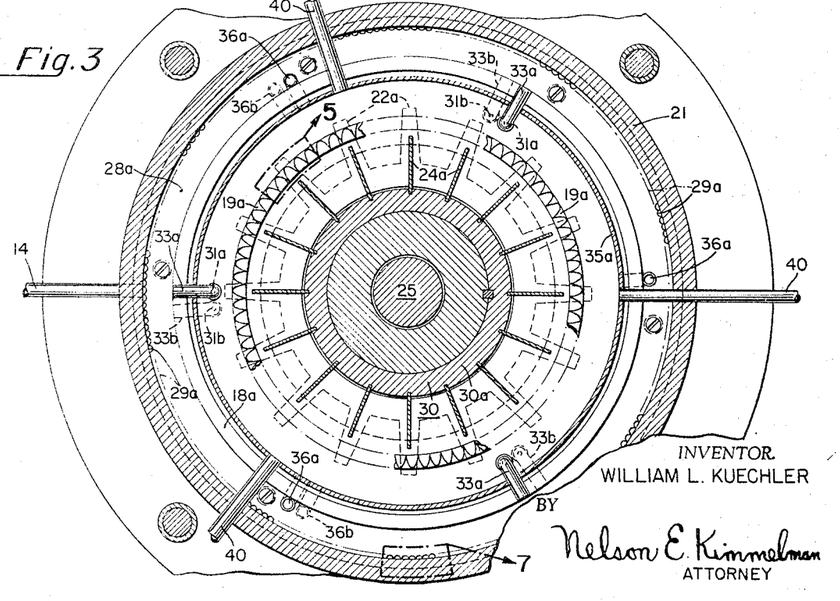

Resting upon and fixed to each of the lower plates 28a, 28b, etc. is an outer annular dam member 18a, 18b, etc. Each of these plates also has fixed thereto an inner annular dam member 19a, 19b, etc. These inner annular dam members have a particular sloped construction as shown in the enlarged views of FIGURES 5 and 6. Affixed to the lower surface of each of the stator annuli 26a, 26b, etc., is a vertical cylindrical or annular wall member 35a, 35b, etc. In stage A the wall 35a supports the reflux tubes 40. It also supports in all of the stages, three gas eduction or transfer tubes 33a, 33b, etc., disposed at 120° angles from one another. The dams 18a, etc., and 19a, etc., and the wall members 35a, etc., effectively divide each stage into two concentric annular processing regions wherein the input mixture liquids are collected. The lower end of each of the gas eduction tubes 33a, 33b, etc., is disposed over a corresponding one of the tapered apertures 31a, etc., and the function of these tubes will be explained later. As shown in FIGURE 3 the sets of tubes 33a, etc., in different stages may be out of exact vertical alignment with their counterparts in other stages, if desired.

Figure 2:
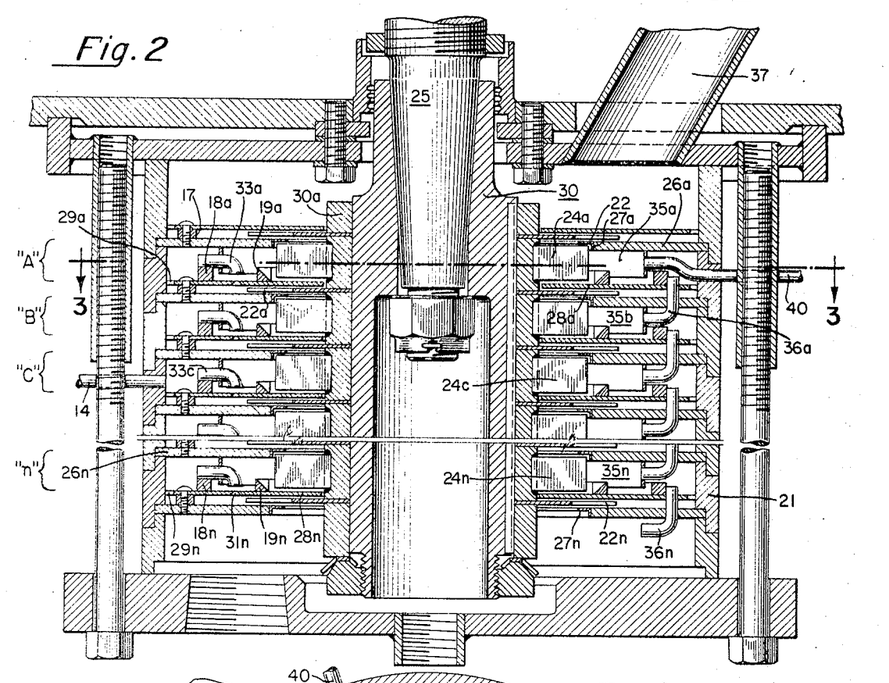

Between the two adjacent stages A and B (and between all other adjacent stages as well) there is located a compressor section bounded on top by the plates 28a, and on the bottom by the stator member 26a. Between this pair of plates is located a plurality of compressor blades 22 which are fixed to the rotor member generally indicated at the numeral 30. There are 16 of the compressor blades 22a radially arranged in the compressor section between stages A and B as well as in each of the other compressor sections or chambers. As the rotor 30 rotates, the compressor blades 22 pump vapor or gas from the next lower stage outward and upward past the scalloped edge portions 29a, etc., thereby producing gas bubles in the liquid in the outer annular region of the stage just above. The blades also pump gas up through the sets of tapered apertures 31a, etc., in each stage. This latter is done with such great force that the gas effectively pumps the liquid mixture from the inner annular region through the transfer tubes 33a, etc., out into the outer region. This transfer counteracts the tendency of liquid in the outer annular region to overflow the dam members 18a, etc., into the inner region and the tendency of liquid particles to collect on the outer surface of walls 35a, etc., and to drip down into the inner region.

The movement of gas upward through the slanted edge portions 29a, etc., produces an inwardly spiralling flow of gas in the outer region which is in the same direction as the rotation of the rotor. It also sets the liquid in the outer region in flowing in the same direction.

Within each of the processing stages there is located a set of sixteen fan blades 24a, 24b, etc., which are soldered, welded, or otherwise fixed to the hub 30a. These blades primarily are used to prevent any very fine liquid particles in suspension in the inner annular region from escaping, as liquid particles, into the output tube 37. They accomplish this by exerting, in the region just outside their tips and between the blades a centrifugal force component on the particles thereby causing them to gather in large numbers in suspension in the inner region. Thus, a large effective contact surface is achieved, yet the particles are kept in liquid form within the apparatus 20. They also fling a number of the suspended particles outwardly so that they impinge upon the inner surface of the wall members 35a, etc., and flow down into the liquid collected between the inner and outer dams 18a, etc., and 19a, etc. In addition, they fling outwardly any of the liquid mixture in the inner region which happens to flow over the dams 19a, etc. This overflow liquid is swept up and over the inclined surface portions 19a whereupon it collects on any surface in its path and will drip down into the inner annular region.

Connecting the outer regions to the inner regions of next lower stages are downcomer overflow tubes 36a, 36b, etc., whose lower ends are fitted into apertures in the depending walls 35a, etc. There are three downcomer tubes 36a, etc., in each stage located at angular separations of 120° from one another.

OPERATION OF APPARATUS 20

In order to start the apparatus 20 the gas from the reboiler 45 is first applied to it, and then the input mixture is applied via the pipe 14 to stage C or other appropriate intermediate stage. As stated above, the gas pumped in at an angle past the scalloped edges 29a, etc., as indicated by the broken line Q in FIGURE 4 causes the liquid mixture on the plates 28a, etc., to move in the same counter-clockwise spiral direction as the rotor 30. The operation of the apparatus may be clearer from an examination of FIGURE 4 wherein the liquid, the liquid particles, etc., are shown as they might appear in one part of one of the processing stages, it being understood that they also would appear similarly in all other stages and parts thereof.

The bubbling of the vapor or gas through the liquid in the outer annular region produces in the area above the liquid mixture a dispersion of liquid particles entrained in the gas therein. The size of the liquid particles suspended in the outer region may be predominantly in the range of 50–100 microns. Since the practical minimal size of the bubbles of gas traversing liquids in conventional bubble plate columns is in the range of about .15 centimeter in diameter, the size range of the liquid particles produced by the present apparatus is from one to two orders of magnitude lower than the size of gas bubbles in conventional bubble plate columns.

As a result of the directional application of the vapor, the gas above the liquid in the outer annular region and the liquid particles suspended therein are caused to move in a generally inward spiral. The radial or inward component of this spiral motion may be considered as a "drag" component. Since the liquid particles are heavier then the gas itself, the liquid particles in the stream will tend to migrate outwardly under the influence of centrifugal force. In passing outwardly, these particles will be moving transverse to the rotary component of motion of the spiral stream so that they may be broken up even further by this generally lateral impact. The apparatus is designed so that, for a high fraction of the particles, the centrifugal force and the drag force are substantially balanced and their net radial movement is slow. Ultimately the larger and slower moving particles will land on the inner surface of the housing wall 21 where they will collect and drip down into the swirling body of liquid in the outer annular region.

The apparatus 20 is so constructed that there will be greater gas pressure in the outer region than in the inner region. This due to the fact that the length of the compressor blades 22, 22a, etc., is greater than the length of the fan blades 24a and therefore the former blades develop a greater pressure rise. As a result, the gas in the outer region will also bubble into the liquid in the inner annular region just outside the circular walls 35a, etc.

Up to this point four possibilities for vapor-to-liquid contact have been explained, i.e., the gas bubbling up past the scalloped edges 29a, etc., the gas contacting the liquid particles in the spiralling stream in the outer region, the gas bubbling from the outer region to the inner annular region under the walls 35a, etc., and the gas bubbling up into the inner annular region through the apertures 31a, etc.

INNER ANNULAR REGION

The stream of gas-liquid particles in the inner annular region also has a rotary movement similar to the movement of the stream in the outer annular region. This movement will be caused by the angular momentum retained by the gas as it flows under the walls 35a, etc. The gas bubbling into the liquid in the inner region will do so with great force and produce large numbers of liquid particles in suspension over the liquid in the inner region. The effect of the balancing of the "drag" component against the centrifugal component will be to produce toward the middle of the inner region a relatively stable average cloud of intermediate sized or intermediate-to-fine particles. The stabilization and replenishment of this cloud is assisted by the fact that the very heaviest liquid particles will be the most affected by the centrifugal action of the blades 24a, etc., and they will move outwardly. From the middle of the inner annular region to the tips of the blades 24a, etc., there will be a progressively greater density of particles in the intermediate-fine size range, the particle size decreasing toward the rotor. At a certain point, they will be so concentrated that they will coalesce into a resultant particle whose weight is sufficiently heavy for it to be flung outwardly by the blades 24a, etc. The particle then splatters against the inner vertical surface of the walls 35a, etc. and its components drip or fall down into the inner annular region once again.

The very fine particles will not be affected to the same extent by centrifugal force and the drag force will move them inwardly toward the rotor. Very fine liquid particles located next to the tips of the blades 24a, etc., are caused to rotate at a very high speed partly because the spiralling stream has a minimum diameter there and partly because the tips of the blades impart a much more direct and intense rotary component of force to them than to particles not within the fan blade periphery. These very fine particles are either flung outwardly or are broken up into even finer particles when they make contact with the fan blade.

Particles having the smallest size will drift further in between the blades 24a, etc., toward the hub 30a and, since the blades will have no appreciable velocity of impact against them, they will either tend to collect on the fan blades themselves until they eventually coalesce into larger size particles or, if they do not collect on the fan blades, a very small number of them will pass upward past the inner edge of the L-sectioned members 27a, etc., until they pass out of the vapor tube 37 with the low-boiler-enriched vapor. In practice, practically all of the liquid particles are repelled by the effects of the blades 24a, etc., as their main function is to keep the liquid phase material, i.e., particles, from going out with the vapor. They also act to maintain the equilibrium population of intermediate size particles in suspension and help to create turbulence, both of which factors tend to increase the effective total contact surface. By the production of the gradient of liquid partiles in the inner annular region, a fifth opportunity for gas-to-liquid contact is effected. The overall range of particle sizes in each stage may be, for example, from 3 microns at the most central part to 100–150 microns at the outermost part.

As some of the liquid in the outer region may arise above the top of the dam members 18a, etc., and fall into the inner annular region, it is necessary to pump constantly some of the liquid in the inner region to the outer region. To do this, gas is passed from the compressor chambers through the apertures 31a, etc., with sufficient force to transport some of the liquid through the gas transfer tubes 33a, etc., into the outer annular region. On the other hand, excess of the liquid mixture accumulating in the outer annular region is fed back into the inner annular region of the lower stage by the so-called "downcomer" tubes 36a, etc.

It is the bubbling of the vapor under high pressure through the liquid on the plates 28a, etc., which produces the great majority of the liquid particles in suspension over the inner and outer regions. If the liquid level in the inner annular region rises above the dam members 18a, etc., it will tend to spill down the inclined surfaces 19a', etc., until it is flung outwardly either by the gas pressure generated by the fan blades 24a, etc., or by being physically engaged by them. If they are flung outwardly and hit an internal surface additional small particles are produced that may become part of the particle cloud in the inner region. These additional particles will constitute only a very minor part of the entire number of particles in the stages in any case.

If the rotor is rotating at a speed such that there is a velocity of say, 150 ft./second at the tips of the classifier blades, the forces acting on the particles at the tips are 2,000–3,000 times the force of gravity. This is to be compared to the simple force of gravity in a conventional bubble plate column which limits the vapor velocity therein, and imposes the much higher volume requirements thereupon.

It will be seen that since all of the compressor blades are of approximately the same length and are attached to a common rotor hub in the apparatus illustrated in FIGURE 2 (although they need not be in other forms of my invention), they will all produce substantially the same pressure increase in each of the compressor sections. Each of the compressor sections increases the vapor pressure in that section to equal about 3.5 inches of water, but this pressure increase is largely dissipated in bubbling through the liquid in the inner and outer annular regions and inward past the classifier blades. With liquid on the plates 28a, etc., there is a net pressure increase of about 0.2″ water per stage.

This equalized pressure feature is very valuable in those cases where it is desired, because of the temperature sensitivity of the materials processed, that there not dbe any large difference in the temperatures at the top and bottom processing stages. In conventional bubble plate columns, there may be a vacuum head created in the topmost stage, but in the lowest stages the temperature will be much higher with the result that any temperature-sensitive materials will be adversely affected. As a matter of fact, with the present apparatus it is possible to keep the maximum temperature lower than would be the case in conventional types of contacting apparatus. For example, if the top stage of my novel apparatus were to be connected to a vacuum generator so that the pressure in the top stage was say, 1 mm. of mercury there would only be a difference of about 5 mm. (mercury) pressure over all the other stages. In the bubble cap column, however, a top pressure of 1 mm. would result in a bottom plate pressure of say, 100 mm. This wide variation in pressure can be directly translated into a wide variation in the temperature to which the materials are subjected.

ALTERNATIVE EMBODIMENT—STRUCTURE

Figure 9:
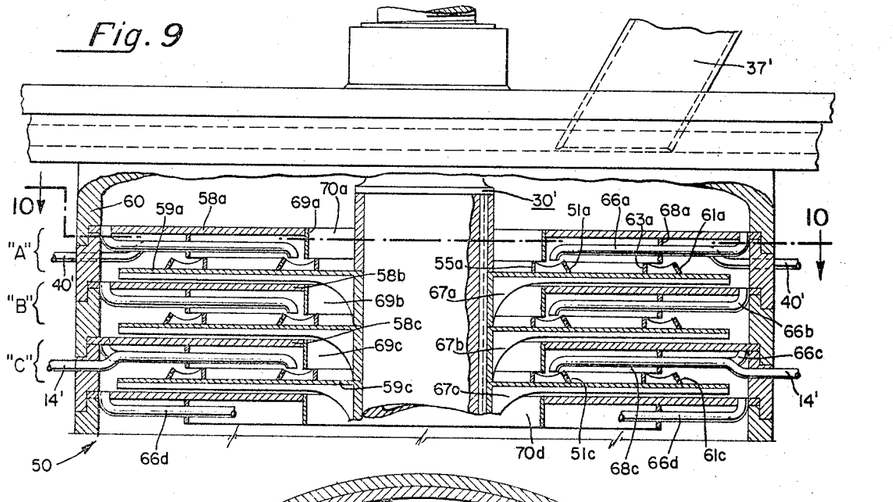

FIGURE 9 shows another embodiment 50 of the invention which may have special utility where there are some solids within the liquid or where the liquids to be processed have relatively high viscosity. It is also useful in other applications where the liquid mixture could possibly become lodged between the scalloped edges 29a, etc., and the inner surface of the housing 21. (One could, of course, possibly use the embodiment of FIGURE 2 but it would probably be necessary to increase the diameter of the apparatus so that the compressor sections could generate higher pressure.) As in the apparatus shown in FIGURE 2, there are a number of stages A, B, etc., of generally similar construction.

Figures 4, 5, 6, 7, 8, 11:
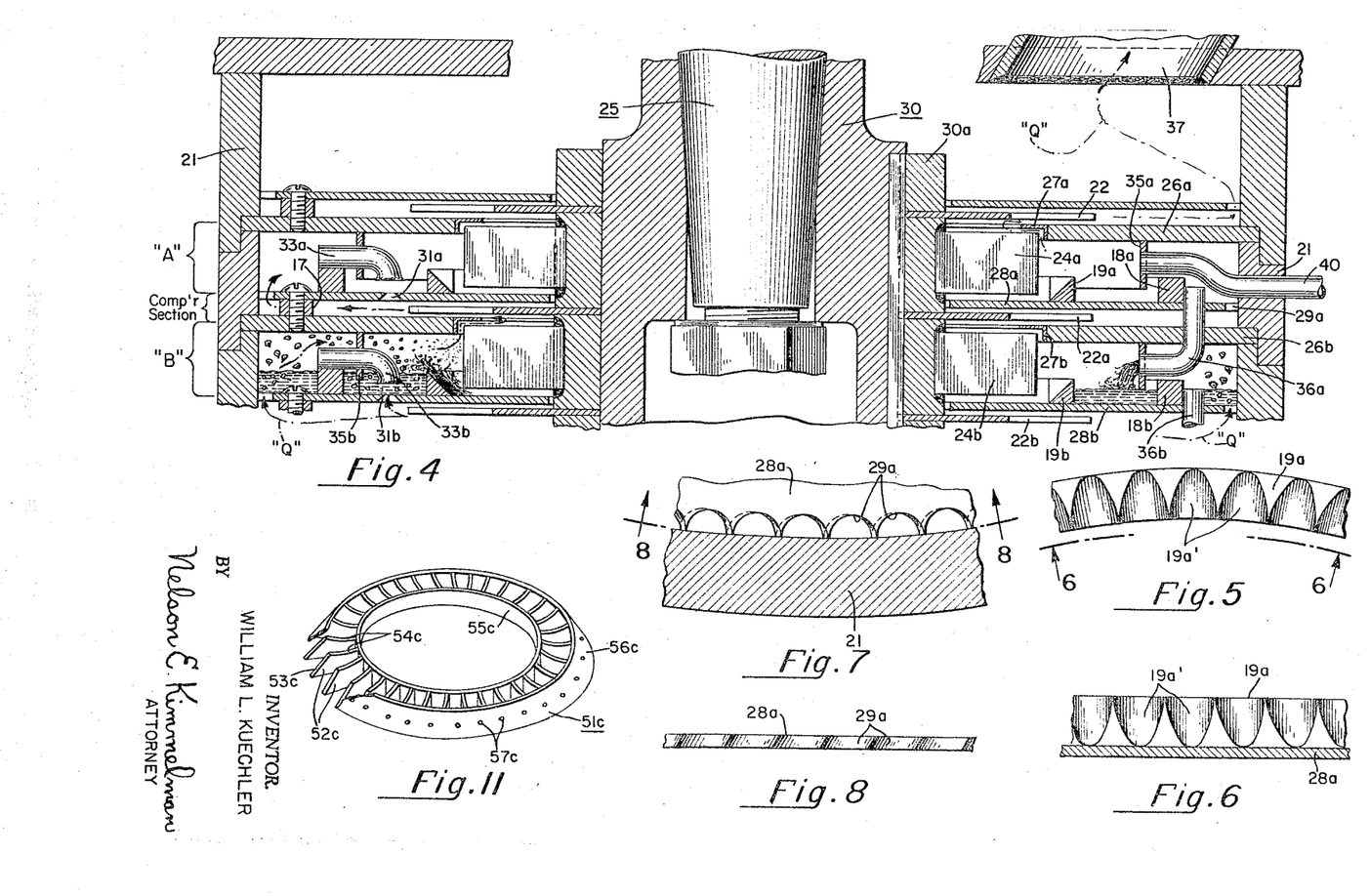

The input liquid mixture is collected on revolving plates 59a, 59b, etc., rather than on stator plates as in the first embodiment. There are two diametrically opposed input tubes 14' whose inner terminal portions are located above an inner circular assembly 51c which is pictured in an enlarged view in FIGURE 11. The assembly 51c has a plurality of vanes 52c which have inwardly inclined outer edges 53c and slightly curved upper edges 54c as shown in FIGURE 11. The plates 52c are mounted between an inner circular wall 55c and an outer frusto-conical wall 56c which is provided with a number of apertures 57c, there being an aperture for each of the "cells" defined by pairs of adjacent plates 52c and the inner and outer wall members 55c and 56c. The assembly 51c is mounted fixedly to the upper surface of the revolving annular plate 59c which is mounted to the hub of the rotor 30'.

On the upper surface of the annulus 59c there is also fixed an outer circular assembly 61c which generally corresponds to the member 51c except that it is of larger radius than the latter. The assembly 61c has an inner vertical wall 63c, an outer frusto-conical wall 64c, and there are a number of apertures 65c therein, there being one for each cell thereof. Each stage has, shown in FIGURE 9 with appropriately numbered components, its counterparts of the assemblies 51c and 61c.

The top boundaries of the stages are the annular stator members 58a, 58b, etc., whose outer edges are fixedly disposed between segments of the housing 60. Toward the periphery of each member 58a, etc., there are also located eight apertures into which the outer terminal portions of eight "downcomer" tubes 66a, 66b, etc., are fixedly disposed. These tubes 66a, etc. are also supported midway in transverse apertures of the outer depending wall members 68a, 68b, etc., whose upper edges are respectively soldered or welded, for example, to the under surfaces of the annuli 58a, etc. Bounding the inner annular openings 70a, 70b, etc. of the annular members 58a, 58b are vertical annular wall members 69a, 69b, etc. affixed thereto. The depending wall 68c in stage C also serves by means of apertures therein, as a support for the input tubes 14'. Affixed to the lower surfaces of each of the rotating annuli 59a, etc., are sixteen compressor blades 67a, 67b, etc., which perform generally the same function as the compressor blades of the previously explained embodiment. That is to say, they suck up the vapor from the next lowest stage through openings 70a, etc. and propel it outward at high speed so as to create it in the next higher stage a generally inward flow of vapor.

The apparatus can consist of any desired number of replicate stages and the bottom of the apparatus can be identical to the bottom of apparatus 20 having an opening for the entry of the vapor and an opening for liquid from the lowest stage to flow through to the reboiler. A vapor tube 37' is also provided for the same purpose as its counterpart in FIGURE 2.

ALTERNATIVE EMBODIMENT—OPERATION

As in the previous embodiment the input mixture of liquids is applied at any desired stage, i.e., to stage C through input tubes 14' to the assembly 51c where it falls between the vanes 52c. The rotor 30' is revolved at very high speeds so that the liquid is forced out through the orifices 57c until it hits the wall 68c (or other surface) whence it will drip down into the outer assembly 61c. In assembly 61c the same general process is repeated, i.e., the liquid mixture is thrust out between the apertures 65c, etc. with great force until it impinges upon the inner surface of the housing wall 60 whereupon it will drip down onto the stator plates 58c, etc., just below. It will collect on the latter plates and flow down to the next stage via the downcomer tubes 66c. The violent movement of the liquid into the assemblies 51a, etc., and 61a, etc., as well as the force with which the liquid is impelled through the apertures against the internal surfaces of the apparatus causes the production of many fine liquid particles in suspension in the vapor.

At the same time, the rotation of the rotor 30' causes the compressor or pump vanes 67a, 67b, etc. to pull up vapor from the next lower stage through the central openings 70a, 70b, etc., then pumps it outwards and up through any liquid or liquid particles located between the outer assemblies 61a, etc., and the inner surface of the housing wall 60. The pressurized vapor or gas will move inward in a rotary or spiral path in each stage and under the annular wall members 68a, etc., passing through the cells of the assemblies 61a, etc., as it goes. The enriched gas then proceeds further inward in a rotary or spiral path, under the walls 69a, etc., and through the cells of the inner assemblies 51a, etc., contacting the many liquid particles in suspension as it does so. It finally is sucked upwards through the central annular openings 70a, etc. and eventually out of the vapor output tube 37' to the condenser.

It should be realized that since the rotor is spinning at high speed in say, a counter-clockwise direction, any liquid within the cells of the inner annular assemblies 51a, etc., or the outer annular assemblies 61a, etc., will tend to be thrust, because of the centrifugal force and the rotary motion, into the outwardly-located corners of the cells where the vanes are joined to the frustro-conical walls. Thus the inwardly flowing gas will not be impeded to any great extent by the presence of large liquid bodies distributed generally throughout the cells.

As the gas flows through the cells inwardly a number of liquid particles become entrained therein. However, the vanes 62a, etc., and 52a, etc., of the inner and outer assemblies operate as classifying blades. That is to say, as the gas moves downward into the cells, the vanes oppose it somewhat by creating a flow having an upward component which tends to repel heavier particles of liquid mixture entrained in the gas and to allow intermediate and fine particles, and the gas to continue to approach the center of the apparatus. Of course, the vanes also tend to break up any parts of the liquid mixture which drips down into the assemblies from the walls 68a, etc., and 69a, etc. Additionally, they will also tend to cause smaller particles to coalesce within the cells until they are thrust out through the apertures.

Since there are two of the vaned assemblies per stage there are two contacts therein and two classifications per stage. Other things being equal, the average size of particles in suspension in the outer region between the housing wall 60 and the walls 68a, etc., will be smaller than the average particle size, and the overall range of particle sizes in the inner region, i.e., between walls 68a, etc., and walls 69a, etc., due to the fact that the assemblies 61a, etc., being at a greater radial distance than the assemblies 51a, etc. are travelling at a greater velocity. In a fractionation application the apparatus would probably be modified somewhat so as to obtain relatively equal effective classification from both of the assemblies 51a, etc. and 61a, etc.

It will be seen that the action of this embodiment is generally similar to the action of the previous embodiment except that in this embodiment most of the liquid particles in suspension are not caused by the force of the bubbling of the gas or vapor through the liquid but rather are caused by the flinging of the liquid mixture out through the apertures in the assemblies 51a, etc. and 61a, etc., and their impact on the internal surfaces. Another difference is that the classifying action of the apparatus shown in FIGURE 9 is divided in each stage between the inner and outer assemblies 51a, and 61a. Apart from these differences, it is still true that the vapor is passed upward counter-current through the descending mixture of liquids and becomes enriched in each progressively higher stage by taking on a greater content of low boilers. Conversely, as the mixture of liquids proceeds downward it becomes progressively weaker in lower boiler content. The enriched vapor eventually passes out through the vapor tube 37′ for condensation to extract the low boiler output component. The liquid mixture proceeds downward and out through the bottom of the apparatus whence it is converted to vapor and reapplied from the bottom upwards.

GENERAL REMARKS

Both of the embodiments previously explained and illustrated may be considered to have contacts per stage as there were two regions, generally an outer region and an inner region, in which the gas was passed through the liquid either in the form of particles or as an agglomerated liquid. It is, of course, entirely possible to make each of the stages just have one contact, but there will be some relative loss of overall volumetric efficiency as compared with the two or more contact assemblies. Additional contacts per stage may, of course, also be provided with increased volumetric efficiency but at the expense of increased mechanical complexity.

While this invention has so far been explained primarily as a type of contacting device for fractionating it should be realized that it may be applied to other chemical opeartions. It may, for example, be used to perform absorption processes, that is, to take a component out of a gaseous phase. For example, if oil is applied to the apparatus and an acetone-water vapor is passed up through the liquid, the acetone would dissolve in the oil whereas the water would not, so that effective separation can be made. Another example of absorption would be the dehumidification of a gas or mixture of gases such as air by contacting them with hygroscopic liquids such as lithium chloride.

The apparatus is also usable for the converse of absorption, i.e., "stripping" where a component is taken out of the liquid phase by passing a gas through it. Such an example would be humidification of air.

Since humidification and dehumidification involve heat transfer, the apparatus also may be used for heat exchange processes like air conditioning, etc.

OTHER FORMS OF THE INVENTION

The invention thus far has been explained in terms of a plurality of contacting stages with which a plurality of compressor stages are interspersed. Also, in the previous embodiments each stage has had two contacting areas, i.e. an outer annular zone and an inner annular zone. It should be appreciated, however, that my invention is not limited to these types of apparatus because the method of the invention can be practiced in a *single* stage without any compressor stage associated therewith. Furthermore, within that single stage there need be only one contacting zone.

Figure 13:
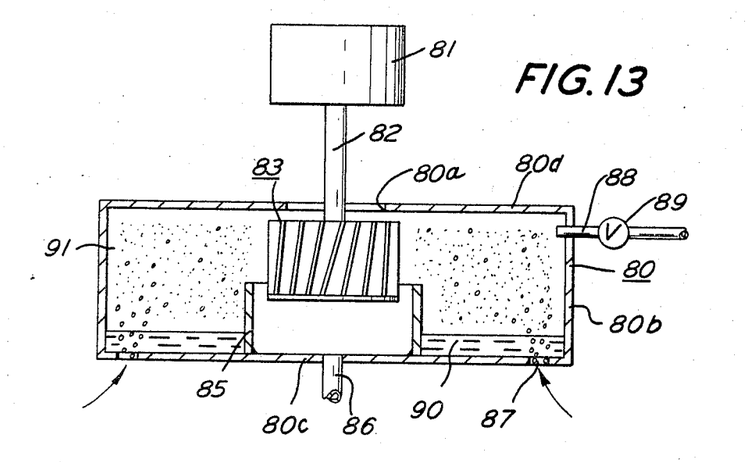

FIGURE 13 illustrates schematically how my invention may be practiced in apparatus in which there is but a single stage and no compressor. A generally cylindrical housing 80 is provided having a top central outlet defined by the edge 80a. Through this opening there extends a shaft 82 from a motor 81, the lower end of the shaft being attached to a multi-bladed fan 83 which, when rotated, draws up air or other gas (as the case may be) through the outlet from within the confines of the chamber defined by the housing 80. Just below the fan 83 and encircling it is a hollow cylindrical dam 85 which is fixed to the floor 80c of the housing. Also formed in the floor are a plurality of angled apertures 87 which are made substantially the same as the apertures 29a, etc. shown in FIGURE 2. Located in the side wall 80b of the housing (or in any other appropriate place therein) there is an input pipe 88 with a valve 89 through which the liquid is applied to the chamber. Part of the liquid will rest as a body 90 on the floor 80c outside of the dam 85.

When the liquid is thus applied and the motor is started, the gas, whether it be ambient air or any other, is drawn through the apertures 87 and bubbles through the body of the liquid with great force thereby disrupting it and producing a number of liquid particles in suspension over the body. The incoming gas passing through the apertures 87 exerts a slight upward lift on the particles and the velocity is such as to balance the effect of gravity thereupon. A vortical flow of the gas toward the center of the chamber is produced having a great number of small, various-sized liquid particles entrained therein. The inwardly spiralling gas flow imparts to these particles centrifugal and centripetal force. The velocity of the gas and the size and other characteristics of the particles are such that, relative to the centrifugal and centripetal forces acting upon them, that a whirling cloud 91 of force-balanced liquid particles suspended in the gas provides a very high aggregate interfacial area.

Figure 1:
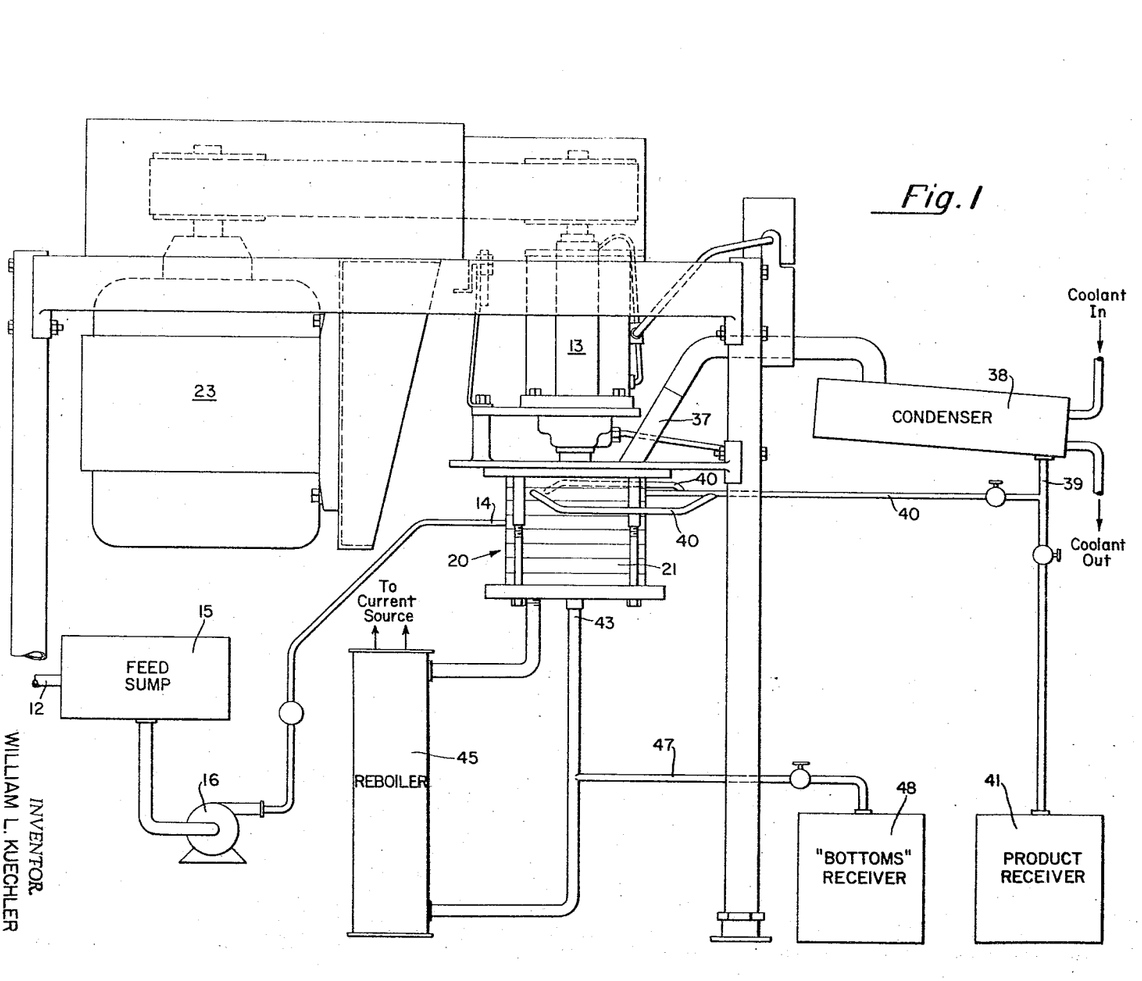

As in the suspensions produced in the embodiments of FIGS. 1 and 9, the finer liquid particles will tend to migrate toward the central portion of the chamber whereas the larger particles will move outwardly and stabilize in position near the periphery of the cloud. The whirling cloud is confined within the chamber by the balancing of centrifugal vs. centripetal force, the offsetting of gravity by the lift force imparted by the angled, upward flow of gas and to a limited extent by the action of the fan blades. The latter operate to propel the very finest liquid particles outward should they be entrained inward toward the outer edge of the fan. The fan thus acts as a final barrier to the escape of the very fine particles and conceivably might be dispensed with if the top annular portion 80d extends inwardly of the inner edge of the cloud.

Figure 14:
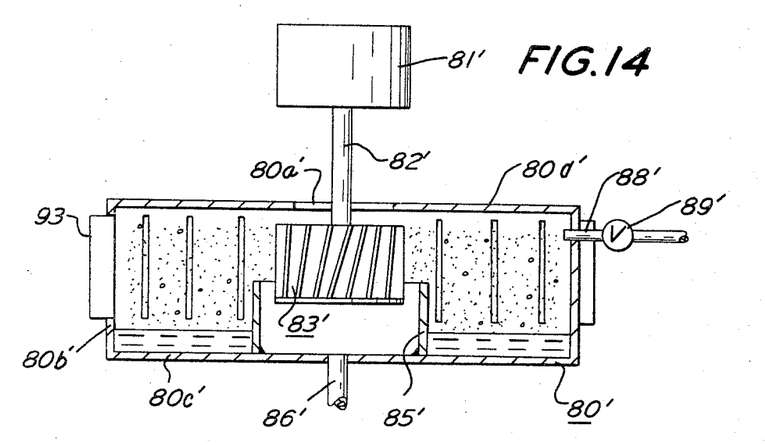

In the embodiment shown in FIGURE 14 the operation is quite similar to the apparatus shown in FIGURE 13, and the parts which are similar thereto bear numbers which are correspondingly primed. However, there are no inlet gas apertures 87, but the outer wall of the housing comprises a plurality of angled louvres 93. When the motor revolves the fan, there is an inrush of gas through the louvres which produces within the chamber an inwardly spiralling flow. The inwardly spiralling flow picks up moisture from the top of the body of liquid thereby producing within a very short time the revolving, confined cloud of liquid particles as in the previous embodiment.

EXAMPLES

The apparatus previously explained in connection with FIGURES 1–11 was tested in several applications. Reproduced below is a table showing operating conditions, dimensions and parameters of three such exampled which may be of value in illustrating the advantages of the present invention.

Figure 10:
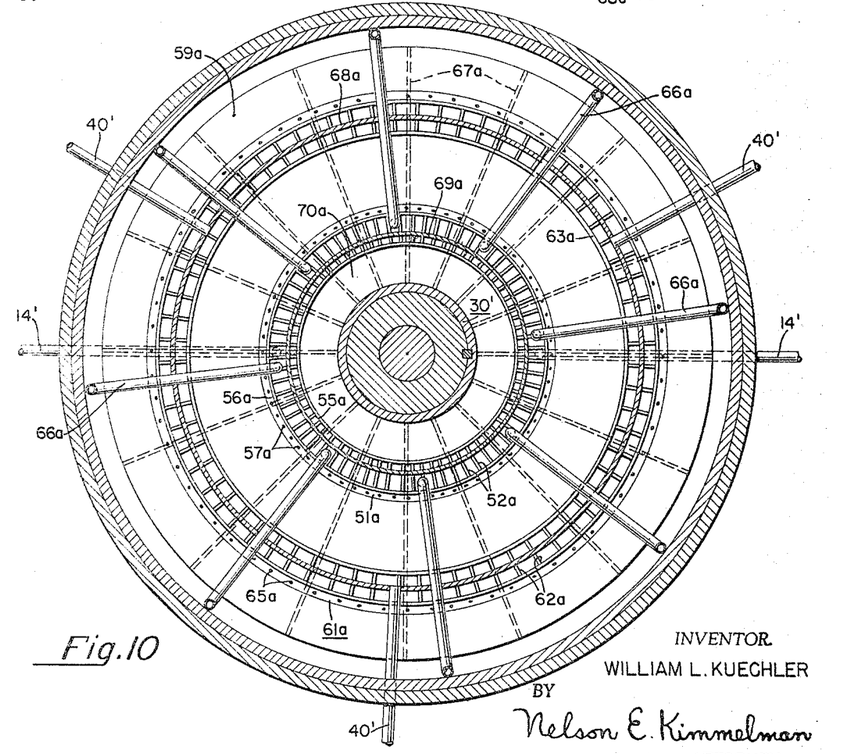

|  | Example I | Example II | Example III |
|---|---|---|---|
| Contacting Apparatus Alone | Figs. 2-8 | Figs. 2-8 | Figs. 9-11.[3] |
| System Auxiliaries | Fig. 1[2] | Fig. 1[2] | (3) |
| I.D., Housing wall Dimensions | 10″ | 10″ | 10″. |
| All others | | Approximately to scale of the drawings | 1. |
| No. of Stages | 2 | 4 | 2. |
| No. of Contacts | 4 | 8 | Dehumidif'n. |
| Type of Operation | Distill'n | Distill'n | Air-water vapor-LiCl sol'n. |
| System | Isopropyl alcohol water | Trichloroethylene perchloroethylene | Single pass. |
| Operating cycle | Total reflux | Total reflux | |
| Flow rate: | | | |
| Vapor, ft./sec | 2.5 | 1.6 | 4.2. |
| Liquid, lb./hr | | Equal to vapor rate | 21.0. |
| Pressure (at top stage) | 760 mm | 760 mm | 760 mm. |
| Pressure (at bottom stage) | 760 mm | 749 mm | 760 mm. |
| R.p.m. (rotor) | 4,000 | 5,000 | 4,000. |
| Composition Feed | (2) | (2) | 80% RH air, 56% LiCl sol'n. |
| "Bottoms" | 0.1 mol percent isopropyl | 1.0 mol percent trichloro | 33% LiCl sol'n |
| "Overhead" (Vapor tube) | 65 mol percent isopropyl | 99.0 mol percent trichlor | 20% RH air |
| Overall Efficiency [1]—E₀ | 80% | 100% | 100%. |
| Ht. of Theoretical contact | 1″ | 1″ | 1″. |

[1] Overall efficiency —E₀ represents the theoretical number of equilibrium contacts divided into the actual number of contacts. Theoretical contacts were determined by the McCabe-Thiel type of graphical construction. X-Y diagrams were used for this construction in distillation examples, and weight composition of liquor vs. percent R.H. of the air was used for the absorption (dehumidification) example. One theoretical plate was subtracted from distillation examples to allow for the reboiler. [2] Distillation examples: (a) Auxiliary apparatus was as shown in Figure 1. The feed sump and pump were used to charge the system only. During operation, all condensate was returned as reflux and no bottoms were removed. This procedure was employed as the most accurate means of determining approach to equilibrium. In other tests at practical feed and product rates, substantially equal efficiencies were obtained, within the accuracy of the experimental results. [3] Absorption (dehumidification example): For this example an apparatus substantially the same as shown in Figures 9-11 was used except that only one stage was provided. Also, the reboiler and condenser were disconnected from the system. Air was inducted directly into the bottom of the unit and exhausted to the ambient atmosphere from the vapor pipe. LiCl solution was the feed from the feed sump to the reflux inlets on the single top stage, and was drained directly to the bottoms receiver.

NOTE.—General: In all tests, the system was operated until all observed conditions had stabilized. Samples of all input and output streams and/or bottoms and overhead samples were then taken and analyzed. Results were plotted according to the McCabe-Thiel of construction to determine theoretical plates.

OTHER APPLICATIONS

While the previous embodiments have illustrated the invention in terms of the transfer of mass from a liquid to a gas phase at the same time mass is going from the gas to the liquid phase, it should be appreciated that other applications of this invention are also possible. Since its mass transfer operation depends upon diffusion and diffusion is a function of the density of the materials involved, the apparatus can also be useful for contacting gases and solids. This may be done by using apparatus generally constructed according to principles involved in the two embodiments illustrated herein, i.e., producing fine particles of one substance and centrifugally classifying them to keep them from going out with the gaseous phase material. While the embodiments of FIGURES 2 and 9 include a number of members which impact the materials processed, it may be necessary to provide additional impacting means. These could take the form of upstanding pins or pegs (located, for example, on the upper surface of the rotary annular members 59a, etc., in the apparatus shown in FIGURE 9) supplanting the inner and outer annular assemblies 51a, etc., and 61a, etc., for example. The solid could be a polymer crystallite of very small size such as, for example, ½ micron which can be obtained by processing in a "cyclone." This crystallite would be fed in instead of the usual liquid input whereas the gaseous phase material could be water vapor applied from below in the usual way. By subjecting the crystallite to successive centrifugal impacts in the apparatus to generate nascent highly reactive surfaces. These high energy sites may enter into various chemical reactions with components of the water vapor, for example. Here the chemical reactions result from physical changes so that it is possible, by controlling the generation of high energy surfaces and the classification process in my novel apparatus, to control the chemical change to a desired point.

In addition to being useful for providing gas-to-solid mass transfer, my novel apparatus may also be used for liquid-to-liquid contacting involving mass transfer. An example of this application would be in the nitration of benzene. A solution of benzene in gasoline could be pumped up from the bottom into the various stages of the apparatus whereas concentrated nitric acid having a much higher density could be applied to the upper stages through input tubes similar to the reflux tubes illustrated previously, for example. The less dense benzene solution would be pumped up by the compressor blades so that it would bubble up through the more dense acid and would be entrained in suspension therein. Since nitric acid is much denser than benzene, the former would tend to be centrifuged outwardly whereas the lighter benzene "bubbles" would proceed inwardly. The benzene bubbles will be pumped upward and become increasingly more nitrated in the higher stages. The nitrated benzene would go into solution in the gasoline and in the topmost stage, the nitrated benzene would settle over the heavier nitric acid so that it could easily be drawn off by a tube connected to an external pump (in place of a condenser as in the previous embodiments). The nitric acid would proceed downward through the apparatus for recycling back into the upper stages by pumping rather than by boiling.

All of the previous applications of the invention have involved mass transfer. However, the apparatus can even be used for contacting substances and producing changes which do *not* involve a mass transfer. For example, it is possible to carry on catalytic processes with my novel apparatus. An instance of this would be the reaction of acetylene with acetic acid vapor in the presence of finely divided carbon based catalyst. The fine particle size catalyst would be fluidized and fed to the apparatus like any liquid phase input. Heated acetylene and acetic acid would be applied from a reboiler in a manner similar to the alcohol-vapor process first described herein. Intimate contact between the vapors and the fluidized catalyst which behaves like a liquid, would occur in the manner previously described for vapor-liquid contact. The usual classification process would enable separation of the solid catalyst phase and the vapor phase materials. There would be no appreciable mass transfer in this process.

It should also be remarked that the word "liquid" as used herein may also be applied to liquids in which there are minute solid particles therein. Conversely, "solids" may include materials which have an appreciable liquid content. Also, when the word "vapor" is used herein it is used in the chemical sense, that is, it is matter in its gaseous phase.

Another application of the present invention would be the desalination of sea water or other saline solutions. In this application, heat transfer and mass transfer would come into play. The sea water and steam would be the substances between which heat and mass transfer would take place. These two substances would be applied to a device substantially like the device shown in FIGURE 9 having some modifications to the flow pattern to provide parallel rather than series operation of the stages. The saline solution would be fed through tubes located in each stage which would be similar to the input tubes 14' of FIGURE 9. Steam would be applied from a reboiler below and the space between the edges of the rotor plates 59a, etc., and the inside surface of housing 60 would be partially sealed off by providing a very restricted aperture communicating each compressor stage with the contacting stage just above. Thus, upon rotation of the vanes 67a, etc., steam from the stage below would be sucked up and compressed in the compressor section. There would be provided water output tubes through the housing wall which communicate with the compressor section to enable the compressed steam, i.e., pure water, to be withdrawn. Some of the steam would, of course, escape through the restricted passageway into the contacting stage just above as dispersing vapor for the sea water in that stage. The compression of the steam in the compressor sections would provide the temperature increment necessary for transferring the heat of condensation to the saline solution in the contacting stage below. This heat would cause some of the water in the sea water solution to go into the gaseous or vapor stage.

To remove the concentrated saline solution from each stage there would be a number of discharge tubes penetrating the housing wall at the periphery of each stage in lieu of the downcomers 66a, etc., shown in the apparatus illustrated in FIGURE 9. The pressures and the resulting temperature increment would be adjusted so that for each quantity of sea water, for example, which is added to a stage, part of the steam would be permitted to enter that stage from the compressor section just below whereas the other part of the steam in that section would be condensed and utilized as the pure water output. A corresponding amount of steam would be evaporated in each stage by virtue of the heat transferred into the saline solution via the stator plate of the stage below the compressor section. This evaporated steam would combine with the steam from the compressor section to provide a total steam input to the compressor stage just above. Steam from the top stage would be recycled into the bottom of the apparatus to complete the cycle.

The forms of the invention depicted in the figures represent examples of some embodiments of my invention. Of course, many modifications in the construction of the apparatus and/or in its mode of operation may be made. For example, the number and/or pitch of the fan blades may be altered. Similarly the number, pitch or other physical characteristics of the compressor blades may be modified. In some cases, it may be desirable to have the number, lengths, shapes, etc. of the compressor or fan blades vary throughout the apparatus. The angle, size, depth or other dimensions of the passageways at the scalloped periphery of the lower stator plates (FIGURE 2) may be designed to suit the particular requirement of the process involved. The number and location of the input tubes, of the recycling tubes, of the gas transfer tubes, or of the downcomer tubes are likewise subject to change.

Therefore, since many modifications will occur to one skilled in the art which do not depart from the essence of my invention, I desire it to be limited only by the claims herein.

I claim:

1. A method of contacting a continuous phase fluid material with a discontinuous phase second material of greater density than said fluid material, comprising:
    (a) establishing a circulating substantially spiral centripetal flow of said fluid material in a predetermined zone, said fluid material entering said zone at an outward portion of said flow and leaving said zone at an inner portion of said flow,
    (b) dispersing said second material in said flow to cause it to circulate therewith in a rotary path,
    (c) imparting to said dispersed second material substantially equal average centripetal and centrifugal forces whereby said second material is caused to circulate about said zone as a substantially stable suspension, and
    (d) imparting to said dispersed second material average substantially equal vector forces in the two opposite directions parallel to the axis of said spiral flow.

2. The method according to claim 1 wherein a reservoir of said second material is provided and wherein said dispersed material is substantially in mass equilibrium with said reservoir of second material.

3. The method according to claim 1 wherein one of said two average substantially equal vector forces imparted to said dispersed material in opposite directions parallel to the axis of said spiral flow is gravity and the other of said opposite forces is effected by an upwardly directed flow of said fluid material.

4. The method according to claim 1 wherein said centrifugal and centripetal forces are substantially greater than said axial forces.

5. The method according to claim 4 wherein said centrifugal and centripetal forces are at least about ten times greater than said axial forces.

6. The method according to claim 1 wherein said spiral flow has a greater radial dimension than its dimension parallel to the axis of said flow within said contacting zone.

7. A method of contacting a first, continuous phase fluid material with a second material of greater density than said first material comprising:
    (a) providing an annular contacting zone,
    (b) producing within said zone a flow of said fluid material which circulates about the axis of said zone and also flows generally inwardly toward said axis,
    (c) distributing said second material within said flow whereupon it becomes dispersed therein and circulates therewith,
    (d) imparting substantially equal average centripetal and centrifugal forces of at least ten times the force of gravity to said dispersed second material,
    (e) limiting the movement of the greater part of said suspended and dispersed second material in a direction parallel to said axis thereby to confine it within said zone, said (d) and (e) steps causing said second material to circulate about said axis in substantially force-balanced suspension, and
    (f) permitting said fluid material continuously to move through said suspension toward said axis and to leave said zone inwardly thereof.

8. The method according to claim 7 wherein said (e) step includes imparting to said suspension substantially equal average vectorial forces in two opposite directions substantially parallel to said axis.

9. The method according to claim 8 wherein a body of said second material is provided and wherein said dispersed material is substantially in mass equilibrium with said reservoir of second material.

10. The method according to claim 9 wherein said (c) step is primarily accomplished by passing said first material through said reservoir of second material at a velocity sufficient to disperse said second material.

11. The method of contacting first and second substances at different densities which comprises:
    (a) producing a flow of said first substance in a predetermined spiralling path, said flow having a component in a generally inward direction,
    (b) providing a body of said second substance,
    (c) dispersing minute particles of said second substance in said path by causing said first substance to flow through said body, said dispersion occurring in a zone substantially free of solid surface contact media and a suspension of said particles in said first substance being produced in said zone, there being a transfer of mass from one of said substances to the other in said suspension,
    (d) subjecting said suspension to centrifugal force of at least about ten times gravity, said force being exerted generally throughout said path in a direction generally opposite to said generally inward direction, and (e) extracting predetermined lower density components from the said suspension as a function of the effect of said centrifugal force on said suspension.

12. A method of contacting a selected number of liquids with a selected number of gases which comprises:
(a) producing a flow of said selected number of gases in a generally inwardly spiralling direction,
(b) providing at least one body of said liquids,
(c) passing said gases through said liquids with force sufficient to comminute the latter, thereby providing minute liquid particles in said spiralling flow in a zone substantially free of solid surface contact of the depending wall in said next lower stage, and (viii) a plurality of sets of fan blades affixed to a rotor assembly disposed axially within said housing, each of said sets of fan blades being disposed between the first and second stator plates of a corresponding one of said stages, (c) compressor sections located between said stages for drawing up substances from the next stage below and impelling these substances into the next stage above in said passageways in said second stator plates and also through the transverse apertures therein, said compressor sections being constructed to exert a greater outward force than said fan blades, (d) means for introducing a first substance through said housing into a selected number of said stages, (e) means toward the bottom of said apparatus for introducing a second substance into said housing, (f) means toward the bottom of said apparatus for permitting withdrawal of processed components proceeding downwardly from stage to stage through said second hollow members, (g) means toward the top of said housing for permitting the withdrawal from said apparatus of predetermined processed components having lesser density than said downwardly-proceeding components, and (h) means extending through said housing for applying a selected number of said processed components of lesser density to a selected number of said stages.

18. Contacting apparatus comprising:
(a) a housing,
(b) a plurality of vertically aligned processing stages, each of said stages including:
(i) a first generally annular stator plate fixed to said housing,
(ii) a second generally annular stator plate, said second plate having its periphery spaced at selected points from the inner surface of said housing and being supported on the first stator plate of the next lower stage, said second stator plate also having a selected number of transverse apertures through it,
(iii) an outer upstanding annular member concentric with said second stator plate and being fixed to the upper surface thereof,
(iv) an inner upstanding annular member having a smaller radius than said outer annular member and being concentric therewith, said inner member also being fixed to the upper surface of said second stator plate, said inner member having a selected number of inclined surfaces which are disposed upwardly from said second plate and outwardly therefrom,
(v) a generally circular wall member depending from the lower surface of said first stator plate in the region between said outer and inner annular members, said depending wall member having a selected number of apertures therein,
(vi) a selected number of first curved tubular members disposed within some of the apertures in said depending wall member, each of said first tubular members having its inner end located between said outer and inner annular members and its outer end communicating with the space between said outer annular member and the said housing, the inner end of each of said hollow members being located substantially directly above one of said transverse apertures in said second stator plate,
(vii) a selected number of second curved tubular members each of whose lower inner ends is disposed within another one of the apertures in said depending walls, each of said second hollow members having a straight portion which passes through aligned apertures in one of said second stator plates and in the first stator plate on which it is supported, the outer end of each of said second hollow members being respectively disposed between said outer annular members and said housing, and (viii) a plurality of sets of fan blades affixed to a rotor assembly disposed axially within said housing, each of said sets of fan blades being disposed between the first and second stator plates of each stage, (c) a plurality of sets of compressor blades interspersed with said sets of fan blades, each set being affixed to said rotor assembly in the space between one of said second stator plates and the next lower first stator plate on which it is supported, said sets of compressor blades having their outer edges located more outwardly than the outer edges of said fan blades, (d) means penetrating said housing for introducing a first substance through said housing into a selected number of said stages, (e) means penetrating said housing for introducing a second substance toward the bottom of said apparatus, (f) means toward the bottom of said apparatus for permitting withdrawal from said housing of said first substance after it has proceeded downward from stage to stage through said second tubular members, (g) means toward the top of said housing for permitting the withdrawal from said housing of predetermined processed components having lesser density than the downcoming components, and (h) means penetrating said housing for recycling selected ones of said less dense processed components to a selected number of said stages.

19. The contacting apparatus according to claim 18 wherein said periphery of each of said second plates is formed to produce discrete upward streams of the substance impelled from the next lower compressor section, said streams being at an acute angle with respect to the plane of said second plate.

20. The contacting apparatus according to claim 19 wherein said recycling means includes a selected number of tubes which penetrate said housing and which are supported in still other apertures in selected ones of said depending walls, wherein the lower edge of each depending wall is no higher than the upper edge of said outer upstanding annular member and wherein each set of fan blades has a vertical dimension which is at least a multiple of the vertical dimension of each of said compressor blades.

21. The contacting apparatus according to claim 20 wherein each of the said first tubular members is predominantly horizontal, wherein its innermost end is no higher than the upper edges of said outer and inner annular members and wherein the upper end of each of said second tubular members is no higher than the upper edge of said outer annular member.

22. A contacting apparatus comprising:
(a) a housing,
(b) a selected number of vertically aligned contacting stages each of which includes means including vertical wall means for providing outer and inner annular regions and also includes peripheral means for permitting the entry of a first substance peripherally into said stage for movement inwardly therein, each of said stages also including rotating fan means for producing centrifugal force generally opposing the inward movement of said first substance, each of said stages also having an upper central opening,
(c) a selected number of compressor sections interspersed with said contacting stages, each of said compressor sections including means for pumping said first substance outwardly and upwardly through said peripheral means of the contacting stage next above, (d) means for transporting excess substance in a higher connecting stage to a lower contacting stage,
(e) means for applying a second substance to a selected number of said contacting stages,
(f) means toward the bottom of said housing for introducing said first substance into said housing,
(g) means toward the top of said housing for permitting the withdrawal of predetermined lighter components of selected ones of said first and second substances which have been contacted in said stages, and
(h) means toward the bottom of said housing for permitting any of said second substance which has been subjected to said contacting action and has proceeded downward through said apparatus via said excess transporting means to be withdrawn from said apparatus.

23. Contacting apparatus according to claim 22 with the addition of means for recycling any desired portion of the said predetermined lighter components into selected ones of said stages for additional processing therein.

24. Contacting apparatus comprising:
(a) a housing,
(b) a selected number of aligned processing stages, each of said stages including:
   (i) a generally annular first stator plate fixed to said housing, said stator plate having a selected number of walls depending therefrom,
   (ii) a generally annular rotor plate, said rotor plate having thereon a selected number of annular assemblies divided by upstanding vanes into a selected number of compartments, each of said annular assemblies having a selected number of apertures in an outer wall thereof which communicate with said compartments, said rotor plate also having fixed thereunder a selected number of radial vanes,
(c) conduit means extending downwardly from one stage to a selected number of stages below,
(d) means for applying a first substance to selected ones of said stages,
(e) means for withdrawing said first substance from said housing after processing therein,
(f) means for introducing a second substance within said housing,
(g) means penetrating said housing for withdrawing said second substance from said housing after processing therein, and
(h) means for refluxing a selected portion of said withdrawn second substance into selected ones of said stages.

References Cited

UNITED STATES PATENTS

| | | | |
|---|---|---|---|
| 1,061,469 | 5/1913 | Gobbe | 261—79 |
| 1,879,582 | 9/1932 | Stout | 261—79 |
| 1,898,807 | 2/1933 | Barnes | 55—257 X |
| 2,213,881 | 9/1940 | Lauer | 55—223 |
| 2,235,998 | 3/1941 | Kleinschmidt | 261—79 |
| 2,840,454 | 6/1958 | Tomlinson et al. | 261—117 X |
| 2,847,083 | 8/1958 | Hibshman | 261—79 |
| 2,941,872 | 6/1960 | Pilo et al. | 261—84 X |

HARRY B. THORNTON, *Primary Examiner.*

T. R. MILES, *Assistant Examiner.*

U.S. Cl. X.R.

261—79, 89, 114, 115, 124; 55—230, 403, 408, 257, 238; 202—238